United States Patent
Serbanescu

(10) Patent No.: US 8,838,377 B2
(45) Date of Patent: Sep. 16, 2014

(54) NAVIGATION DEVICE AND METHOD

(75) Inventor: Alexandru Serbanescu, Amstelveen (NL)

(73) Assignee: TomTom International B.V., Amsterdam (NL)

( * ) Notice: Subject to any disclaimer, the term of this patent is extended or adjusted under 35 U.S.C. 154(b) by 86 days.

(21) Appl. No.: 13/501,513

(22) PCT Filed: Oct. 12, 2009

(86) PCT No.: PCT/EP2009/063263
§ 371 (c)(1),
(2), (4) Date: Apr. 17, 2012

(87) PCT Pub. No.: WO2011/044923
PCT Pub. Date: Apr. 21, 2011

(65) Prior Publication Data
US 2012/0209507 A1    Aug. 16, 2012

(51) Int. Cl.
| | |
|---|---|
| *G01C 21/00* | (2006.01) |
| *G01C 21/34* | (2006.01) |
| *G08G 1/123* | (2006.01) |
| *G01C 21/30* | (2006.01) |
| *G01C 21/04* | (2006.01) |
| *G01C 21/26* | (2006.01) |

(52) U.S. Cl.
CPC .............. *G01C 21/30* (2013.01); *G01C 21/005* (2013.01); *G01C 21/04* (2013.01); *G01C 21/26* (2013.01)
USPC ........................................................ 701/410

(58) Field of Classification Search
CPC ........ G01C 21/05; G01C 21/04; G01C 21/26; G01C 21/30
USPC ........................................................ 701/410
See application file for complete search history.

(56) References Cited

U.S. PATENT DOCUMENTS

| | | | | |
|---|---|---|---|---|
| 5,416,477 A | * | 5/1995 | Shibata | 340/988 |
| 5,508,931 A | * | 4/1996 | Snider | 701/446 |

(Continued)

FOREIGN PATENT DOCUMENTS

| | | |
|---|---|---|
| JP | H0861968 A | 3/1996 |
| JP | 2006292502 A | 10/2006 |

(Continued)

OTHER PUBLICATIONS

International Search Report issued Sep. 6, 2010 for International Application No. PCT/EP2009/063263.

*Primary Examiner* — Mary Cheung
*Assistant Examiner* — Frederick Brushaber

(57) ABSTRACT

A navigation device comprising a receiver for receiving signals from position sensors, memory having stored therein a seed position and map data which comprises a map of navigable routes in an area, and an output device, such as a display or speaker, for outputting a current location. The navigation device further comprises a processor for determining distance travelled and changes in orientation from the signals and estimating the current location on one of the navigable routes of the map data. The step of estimating comprises using the distance travelled and the changes in orientation to extrapolate from the seed position possible paths along the navigable routes that the navigation device may have travelled and assigning to each path a probability that the navigation device travelled that path. For changes in orientation, the processor expands each path and recalculates the probability that the navigation device travelled that path. The processor assigns the current location to be a current predicted position on the path with the highest probability.

16 Claims, 7 Drawing Sheets

(56) References Cited

U.S. PATENT DOCUMENTS

| | | | |
|---|---|---|---|
| 5,774,824 A * | 6/1998 | Streit et al. | 701/446 |
| 6,662,105 B1 * | 12/2003 | Tada et al. | 701/420 |
| 2004/0158392 A1 * | 8/2004 | Choi | 701/201 |
| 2005/0071078 A1 * | 3/2005 | Yamada et al. | 701/201 |

FOREIGN PATENT DOCUMENTS

| | | |
|---|---|---|
| JP | 2006337114 A | 12/2006 |
| WO | 9951940 A1 | 10/1999 |
| WO | 2008010049 A2 | 1/2008 |

\* cited by examiner

NAVIGATION DEVICE AND METHOD

CROSS-REFERENCES TO RELATED APPLICATIONS

This application is the National Stage of International Application No. PCT/EP2009/063263, filed Oct. 12, 2009 and designating the United States. The entire content of this application is incorporated herein by reference.

FIELD OF THE INVENTION

This invention relates to navigation devices and to methods for navigation devices. Illustrative embodiments of the invention relate to portable navigation devices (so-called PNDs), in particular PNDs that include Global Navigation Satellite System (GNSS) signal reception and processing functionality. Other embodiments relate, more generally, to any type of processing device that is configured to execute navigation software so as to provide route planning, and preferably also navigation, functionality.

BACKGROUND TO THE INVENTION

Portable navigation devices (PNDs) that include GNSS signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM, CDMA and the like.

PND devices of this type also include a GNSS antenna by means of which satellite-broadcast signals, including location positioning data, can be received and subsequently processed to determine a current location of the device.

The PND device may also include electronic gyroscopes and accelerometers which produce signals that can be processed to determine the current angular and linear acceleration, and in turn, and in conjunction with location information derived from the GNSS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user traveling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centred with the map information of current and surrounding roads in the vicinity of the current device location and other map features also being displayed, determined by the PND using a GNSS receiver. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favourably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the 720T model manufactured and supplied by TomTom International B.V., provide a reliable means for enabling users to navigate from one position to another.

At times during navigation, GPS signals used by a navigation device to determine a current location may become unavailable. In such a scenario, matching of the position obtained via GPS to a location on a displayed map is no longer possible.

It is known to overcome this problem using dead reckoning to provide an estimate of position during gaps in GPS coverage. One known method of dead reckoning is to estimate the path traveled by a vehicle from a known location based on a change of angle and distance traveled by the vehicle (position information) derived from movement sensors, such as gyroscopes and accelerometers. This estimated path is them matched to a map data, such as a map of the road network.

The problem with such a technique is that errors in the measurements made by the position sensors can result in an incorrect path being estimated. For inbuilt navigation devices that derive position data from a tachometer of a vehicle, these errors tend to be small but for PNDs that derive position data from sensors external to the vehicle, these errors can be quite large, particularly when the position data is derived by integrating the signals from sensors that measure the rate of change of the position data (differential sensors). For example, deriving distance from an accelerometer through double integration of the measured acceleration. As the position data is derived through integration of the measured values, small linear increases in errors in the measured value result in large non-linear increases in errors in the position data derived from the measured value. These large errors can result in large errors in the estimate of position and, as a result, incorrect display of the vehicles path/position on a map.

SUMMARY OF INVENTION

According to a first aspect of the invention there is provided a navigation device comprising a receiver for receiving signals from position sensors, a memory having stored therein a seed position and map data which comprises a map of navigable routes in an area, an output device for outputting a current location and a processor for determining distance traveled and changes in orientation from the signals and estimating the current location on one of the navigable routes of the map data, the step of estimating comprising:— using the distance traveled and the changes in orientation to extrapolate from the seed position possible paths along the navigable routes that the navigation device may have traveled and assigning to each path a probability that the navigation device traveled that path, for changes in orientation, expanding each path and recalculating the probability that the navigation device traveled that path, and assigning the current location to be a current predicted position on the path with the highest probability.

A navigation device of the invention may have the advantage that if an error in position data (distance and orientation) based on the signals received from the sensors results in the current location on the map being incorrect, this error may be corrected at a later date based on further position data and matching of this further position data to the map data. For example, initially a possible path may have a high probability because of the inherent errors in the position data but as further position data is received the probability of this path may reduce to such an extent that another path becomes the most likely path traveled, the navigation device changing the current location to the position on the now more likely path. This "regression" is not possible in conventional devices that do not determine other possible paths once a decision point (intersection or articulation of routes of a path) has passed.

The probability of each path being the path the navigation device traveled may be determined by comparing the changes in orientation with corresponding changes in the angle of the navigable routes of the path. For instance, the changes in orientation may be as a result of a turn made at an intersection of two navigable routes or a curve of the navigable route itself. A probability for a path may be determined by determining a probability that a particular sequence of changes in orientation corresponds to movement along particular navigable routes, for example road segments, that form the path. For example, the probability for a path may be calculated by determining separate probabilities for each navigable route that makes up the path and multiplying or summing these probabilities together. A route could be associated with more than one path and a route may have multiple probabilities associated with it, one for each path.

A change in orientation may be a discrete event beginning when a change in angle in a unit time above a predetermined angle threshold is detected, for example above a few degrees per second, to when changes in angle per unit time stabilise again to less than the predetermined threshold. In this way, expansion and recalculation of the probability is only carried out on completion of a manoeuvre, reducing the amount of processing compared to a more continuous process.

Estimating the current location may further comprise expanding each path and recalculating the probability that the navigation device traveled that path for changes in distance. As with changes in orientation, the change in distance at which point the expansion of the paths and recalculation of the probability is carried out may be a change in distance above a predetermined distance threshold, for example, ten(s) or hundred(s) of meters.

The processor may be arranged to discard paths from further expansions and calculations when the probability of the navigation device having traveled that path drops below a predetermined probability threshold.

For example, the probability threshold at which a path is discarded may be when the path is not one of a number, N, of most likely paths. The greater the value of N the more processing the processor will have to be carry out for each change in orientation/change in direction but the less likely it is that a path is discarded that may later become the most likely path traveled by the navigation device. In most circumstances, discarding all but the two most likely paths is robust enough to find the correct path later if an incorrect path is initially identified as the most likely path.

Additionally or alternatively, the probability threshold at which a path is discarded may be a set number. For example, if the probability of a path is below the set number the path is discarded or if a ratio of the probability of the path to the probability of the path that is currently the most likely path is less than a set ratio the path is discarded.

The processor may be arranged to discard each path that is not the path with the highest probability from further expansions and calculations when the number of expansions of the path is above a predetermined expansion threshold. Again, setting an appropriate expansion threshold can be used to keep the amount of processing required to an acceptable level. The expansion threshold may be just a few expansions such as 2, 3, 4 or 5 expansions.

During expansion of the paths, seed points will be created where a path divides (thus forming two or more paths). An initial seed point is the first seed point at which two or more paths are created If a path is disregarded, this may result in the initial seed point moving to a new location. The processor may be arranged to disregard the contribution to the paths' probabilities of routes that are before the initial seed point. In this way, the processor does not carry out unnecessary calculations or store unnecessarily large amounts of data.

The processor may be arranged to set the seed position in memory to the current location when there is only a single possible path (as a result of other paths being discarded or no other possible paths existing) and/or to a seed point.

The position sensors may comprise sensors for measuring acceleration, speed, distance, time and/or change in angle. In one embodiment, the position sensors comprise an accelerometer and/or a gyroscope. The navigation device may comprise the position sensors or, alternatively, the navigation device may comprise an input for connecting to the position sensors.

The output device may be a display and/or speaker.

The navigation device may comprise a global navigation satellite system (GNSS) receiver or an input to be connected to a GNSS receiver and the processor is arranged to estimate a current location from signals received by the GNSS receiver when GNSS signals are available and estimate a current location in accordance with the steps described above when GNSS signals are unavailable. In this way, the navigation device can continue to track a position even when GNSS signals are not received.

According to a second aspect of the invention there is provided a data carrier having stored thereon instructions which, when carried out by a processor connected with a memory, the memory having stored therein a seed position and map data which comprises a map of navigable routes in an area, cause the processor to:—
  receive position data on distance traveled and changes in orientation;
  estimate a current location on one of a plurality of navigable routes of map data from the position data; and
  output the current location to an output device;
wherein the step of estimating comprises:—
  using the distance traveled and changes in orientation to extrapolate from the seed position possible paths along the navigable routes that the navigation device may have traveled and assigning to each path a probability that the navigation device traveled that path,
  for changes in orientation, expanding each path and recalculating the probability that the navigation device traveled that path, and
  assigning the current location to be a current predicted position on the path with the highest probability.

According to a third aspect of the invention there is provided a method of estimating a current location on a map of navigable routes using position data, the method comprising:—
  determining distance traveled and changes in orientation from the position data;
  using the distance traveled and the changes in orientation to extrapolate from a seed position possible paths along the navigable routes that may have been traveled and assigning to each path a probability that the path was traveled,
  for changes in orientation, expanding each path and recalculating the probability that the navigation device traveled that path, and
  assigning the current location to be a current predicted position on the path with the highest probability.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a PND. It should be noted, however, that the teachings of the present invention are not limited to PNDs but are universally applicable to other types of navigation devices that locates a current position on a map. It follows therefore that in the context of the present application, a navigation device is intended to include (without limitation) navigation devices, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

Figure 1:
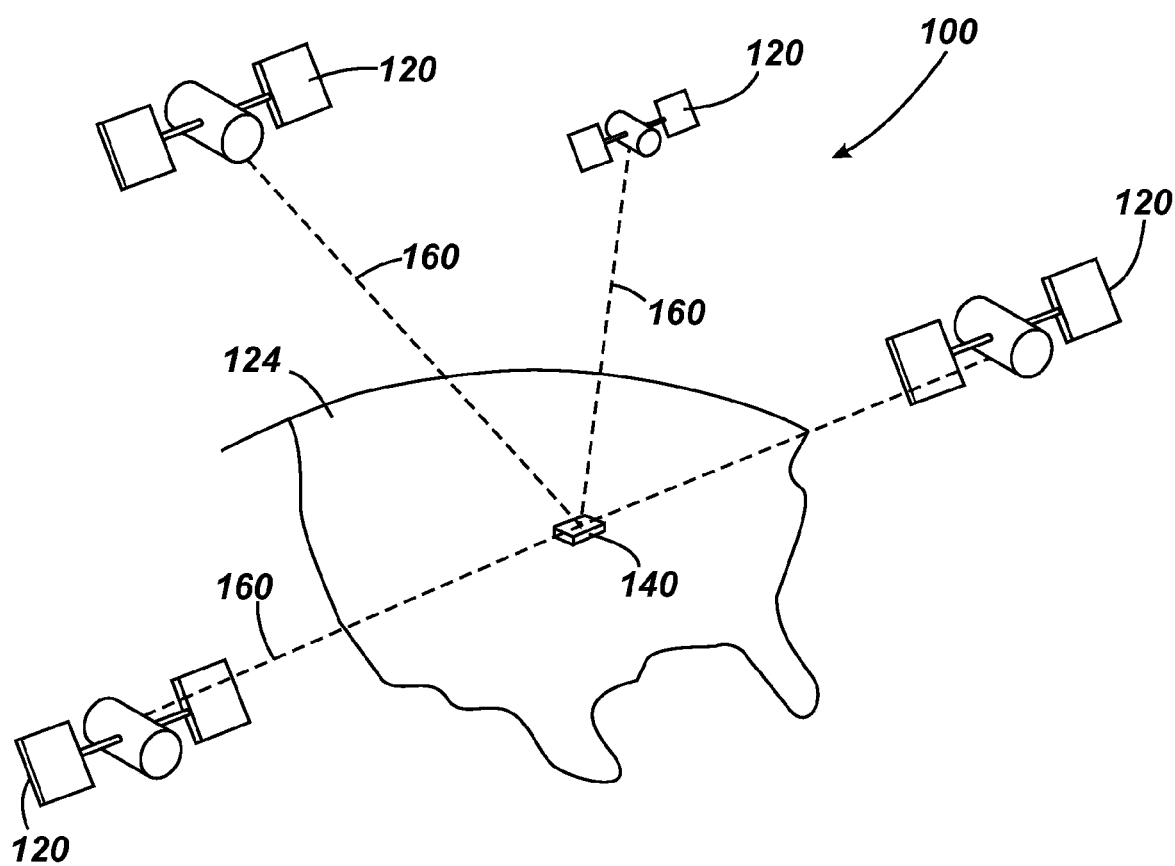
FIG. 1 is a schematic illustration of a navigation device communicating with a Global Navigation Satellite System (GNSS)

With the above provisos in mind, FIG. 1 illustrates an example view of Global Navigation Satellite System (GNSS) 100, usable by navigation devices 140. In general, GNSS is a satellite-radio based navigation system capable of determining continuous position, velocity, time, and in some instances direction information. A GNSS comprise a plurality of satellites 120 in orbit about the earth 124. The orbit of each satellite 120 is not necessarily synchronous with the orbits of other satellites 120 and, in fact, is likely asynchronous. The GNSS satellites relay their location to receiving units 140 via signals 160. The GNSS receiver 140 receives the spread spectrum GNSS satellite signals 160 and determines its position from the position information relayed by the satellites.

The navigation device of the invention may use GPS, formerly known as NAVSTAR, Galileo, GLOSNASS, or any other suitable GNSS. The GNSS incorporates a plurality of satellites 120 which orbit the earth in extremely precise orbits.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GNSS receiver device 140 generally acquires spread spectrum GNSS satellite signals 160 from at least three satellites 120 for the GNSS receiver device 140 to calculate its two-dimensional position by triangulation. Acquisition of an additional signal, resulting in signals 160 from a total of four satellites 120, permits the GNSS receiver device 140 to calculate its three-dimensional position in a known manner.

The GNSS system is implemented when a device, specially equipped to receive GNSS data, begins scanning radio frequencies for GNSS satellite signals. Upon receiving a radio signal from a GNSS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

Figure 2:
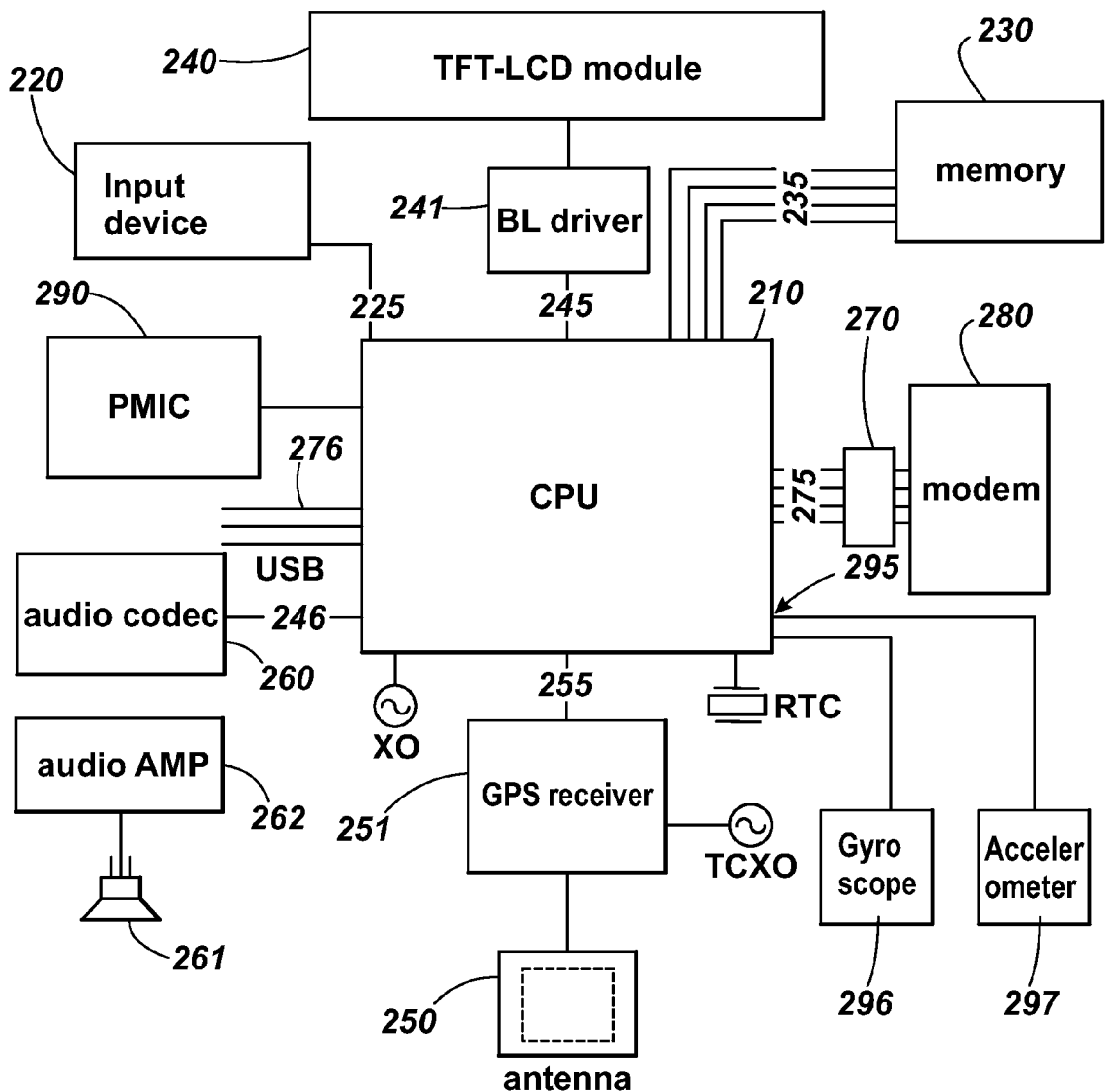
FIG. 2 is a schematic illustration of electronic components arranged to provide a navigation device in accordance with a first embodiment of the invention.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

Figure 4A:
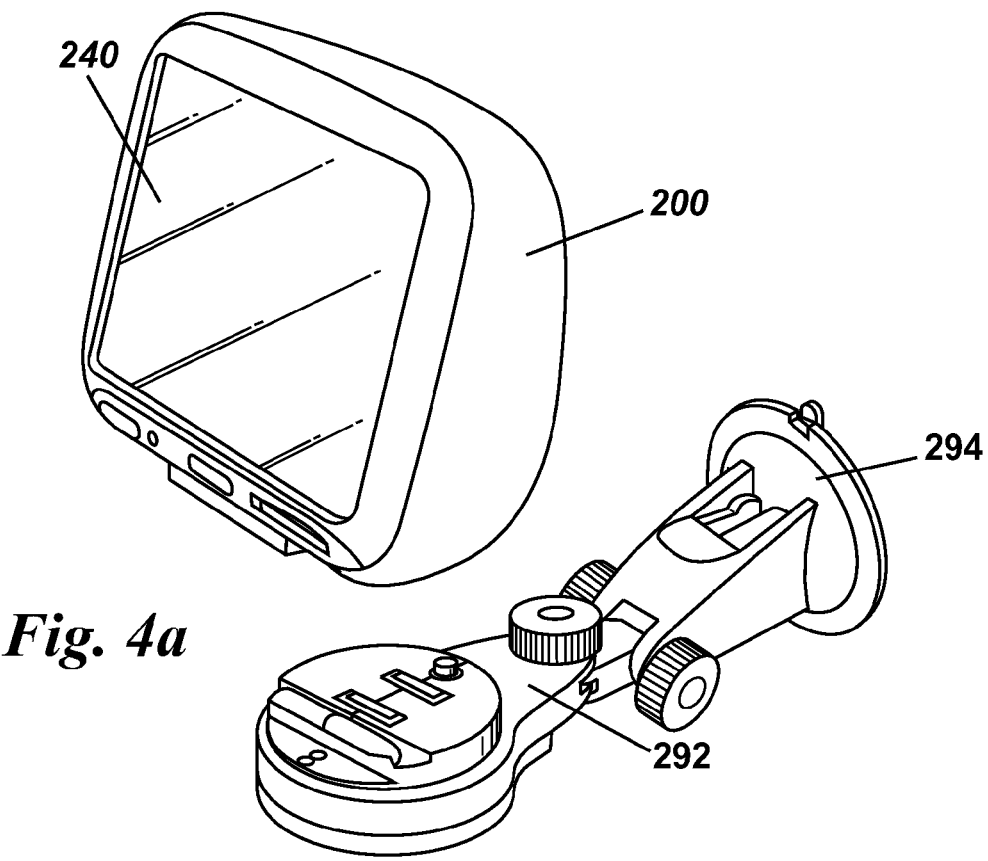
FIGS. 4A and 4B are illustrative perspective views of a navigation device.
Figure 4B:
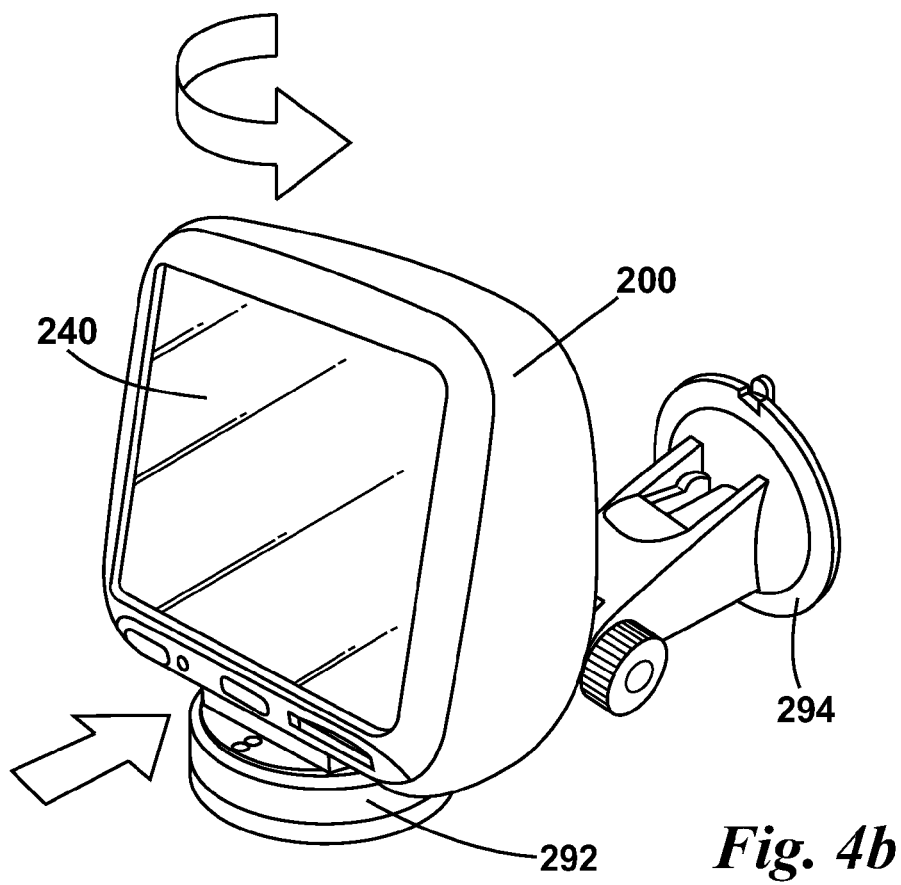

The electronic components of the navigation device 200 are located within a housing such as that shown in FIGS. 4A and 4B. The navigation device includes a processing device 210 connected to an input device 220 and a display screen, in this embodiment an LCD 240, comprising a backlight driver 241 connected with the processing device 210. The input device 220 can include a keyboard device, voice input device, touch panel and/or any other known input device utilised to input information; and the display screen 240 can include any type of display screen such as an LCD display, for example. In this arrangement the input device 220 and display screen 240 are integrated into an integrated input and display device, including a touchpad or touch screen input so that a user need only touch a portion of the display screen 240 to select one of a plurality of display choices or to activate one of a plurality of virtual buttons.

The navigation device may include an output device 260 to 262, for example a loudspeaker 261, an audio amplifier 262 and audio codec 260. The audio device 260 to 262 can produce audio commands for directing the user in accordance with a determined navigable route.

In the navigation device 200, processing device 210 is operatively connected to and set to receive input information from input device 220 via a connection 225, and operatively connected to at least one of display screen 240 and output device 260, via output connections 245 and 246, to output information, including a current location, thereto. Further, the processing device 210 is operably coupled to a memory resource 230 via connection 235. The memory resource 230 comprises, for example, a volatile memory, such as a Random Access Memory (RAM) and a non-volatile memory, for example a digital memory, such as a flash memory. The memory resource has stored therein map data which comprises a map of navigable routes in an area, for example, a map of navigable routes in a country, such as UK or the Netherlands. In this embodiment, each route of the map data is segmented with each segment having data associated therewith that defined attributes of that segment, for example speed limits, traffic profiles, other road regulations, etc.

The navigation device 200 further comprises a connection 270 for detachably connecting to a cellular modem 280, such as a mobile telephone, for receiving broadcast signals, such as BCCH, from base stations of cellular networks. The connection 270 may be used to establish a data connection between the navigation device 200 and the Internet or any other network for example, and/or to establish a connection to a server via the Internet or some other network for example. In another embodiment, device 280 may be a portable television receiver or a radio receiver that can receive TMS/RDS information.

FIG. 2 further illustrates an operative connection between the processing device 210 and a GNSS antenna 250 and receiver 251 via connection 255. The antenna may be a GNSS patch antenna or helical antenna for example.

Further, it will be understood by one of ordinary skill in the art that the electronic components shown in FIG. 2 are powered by power source 290, in this case a power management integrated circuit 290, in a conventional manner.

A wired connection 276, in this embodiment a USB connection, is also provided for connecting the processing device 210 to a computer or the like. Such a connection can be used for software/firmware updates and/or map updates.

The navigation device 200 comprises a receiver 295, in this embodiment a connector for connecting to position sensors, in this embodiment a gyroscope 296 and accelerometer 297, such that the CPU 210 can receive signals from the gyroscope 296 and accelerometer 297.

As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example by using the mounting device 292/294 shown in FIGS. 4A and 4B. Such a navigation device 200 is then removable from the docked location for portable or handheld navigation use.

Figure 3:
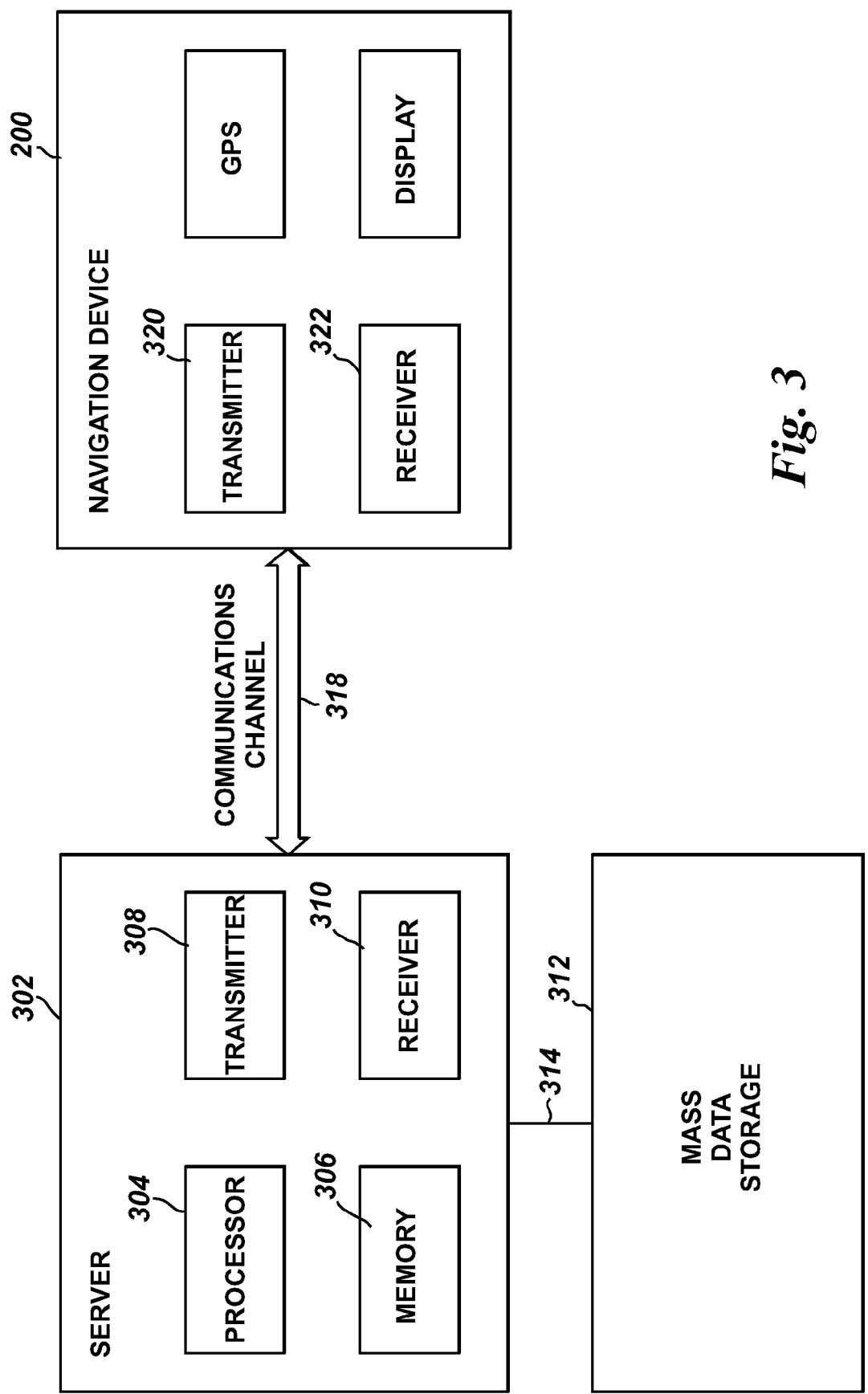
FIG. 3 is a schematic illustration of the manner in which a navigation device may receive information from a server over a wireless communication channel.

Referring now to FIG. 3, the navigation device 200 may establish a "mobile" or telecommunications network connection with a server 302 via the cellular modem 280 establishing a digital connection (such as a digital connection via known Bluetooth technology for example). Thereafter, through its network service provider, the cellular device can establish a network connection (through the Internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using the Internet (such as the World Wide Web) for example, can be done in a known manner. This can include use of TCP/IP layered protocol for example. The mobile device can utilize any number of communication standards such as DVB-H, DVB-T, CDMA, GSM, Wi-Max, TMC/RDS, etc.

As such, an Internet connection may be utilised which is achieved via data connection, via a mobile phone or mobile phone technology within the navigation device 200 for example. For this connection, an Internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the Internet).

The navigation device 200 can further complete a data connection with the mobile device, and eventually with the Internet and server 302, via existing Bluetooth technology for example, in a known manner, wherein the data protocol can utilize any number of standards, such as the GSRM, the Data Protocol Standard for the GSM standard, for example.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processing device 304 operatively connected to a memory 306 and further operatively connected, via a wired or wireless connection 314, to a mass data storage device 312. The processing device 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processing device, memory, etc. as previously described with regard to FIGS. 2 and 3, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processing device 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fibre optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processing device 304 in the server 302 may be used to handle the bulk of the processing needs; however, processing device 210 of navigation device 200 can also handle much processing and calculation, oftentimes independent of a connection to a server 302.

FIGS. 4A and 4B are perspective views of a navigation device 200. As shown in FIG. 4A, the navigation device 200 may be a unit that includes an integrated input and display device 290 (a touch panel screen for example) and the other components of FIGS. 2 and 3 (including but not limited to internal GPS receiver 250, processing device 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked. As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

When this user switches on their PND, the device acquires a GNSS fix and calculates (in a known manner) the current location of the PND. Using this current location the PND can determine a navigable route in accordance with conventional algorithms and provide directions to a user.

Figure 5:
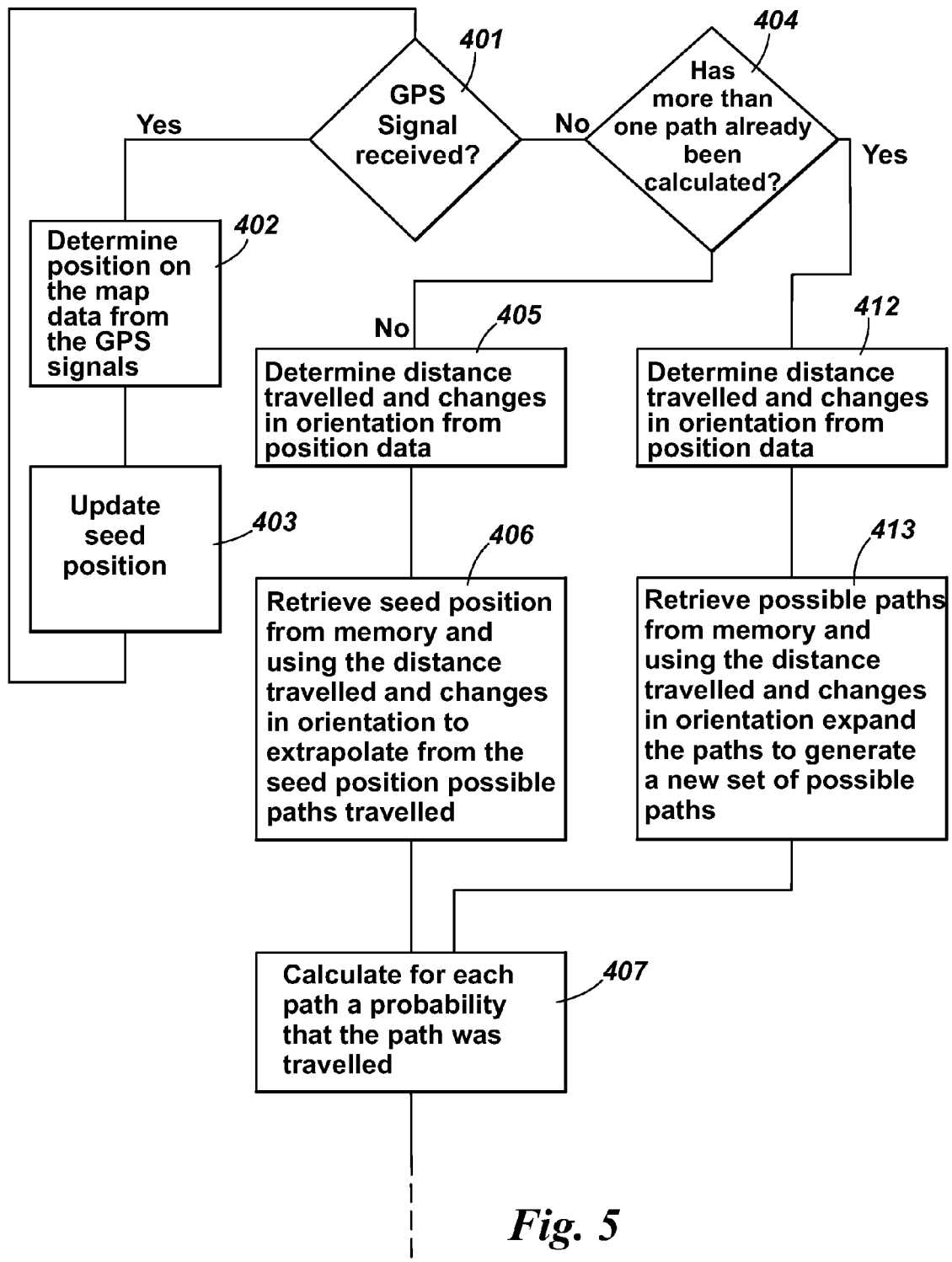
FIG. 5 shows a method carried out by the navigation device in accordance with an embodiment of the invention.
Figure 5:
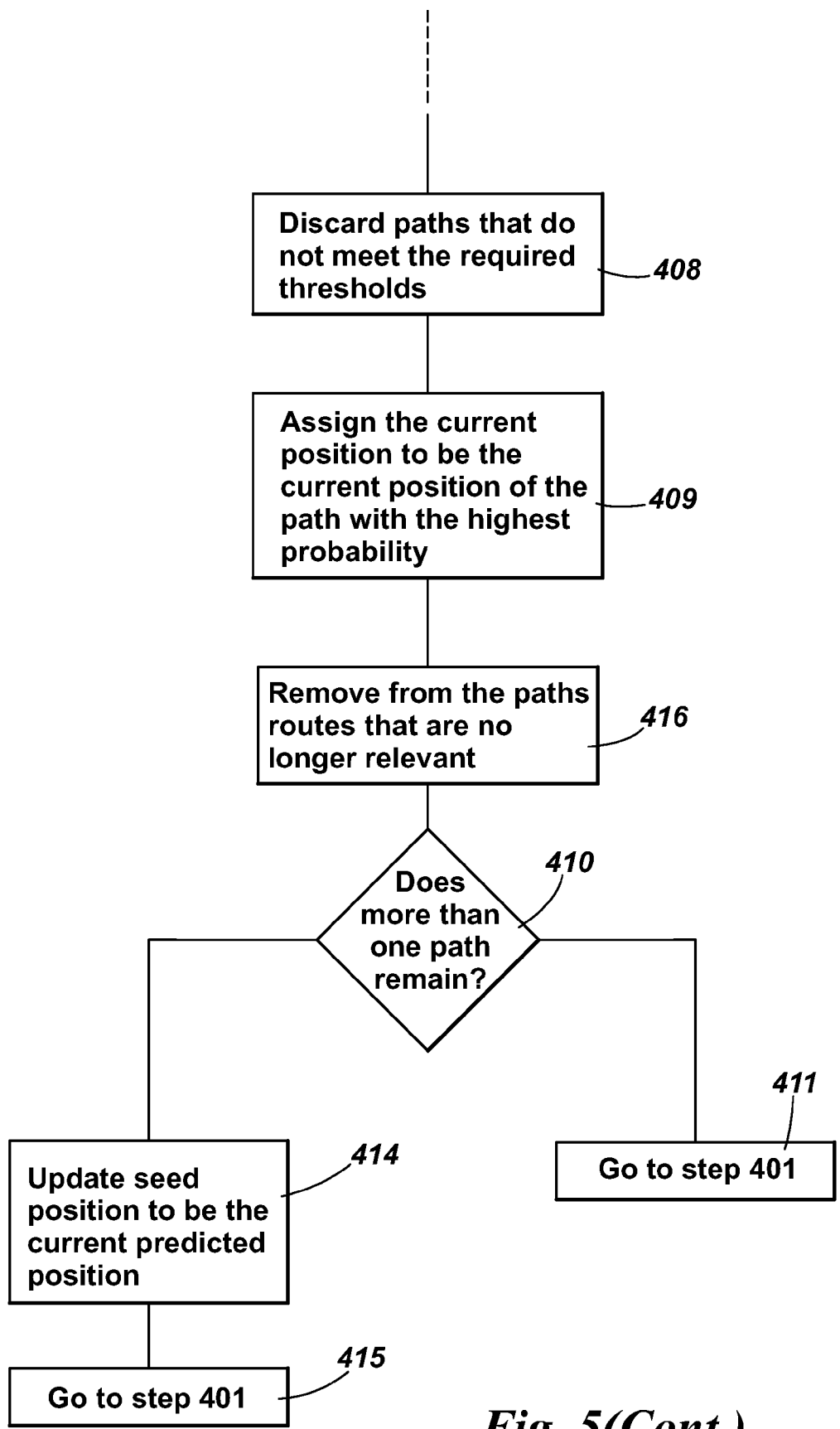

Now referring to FIG. 5, stored on memory resource 230 is a computer program comprising instructions, which when executed by the processor 210, cause the processor to carry out the method steps now described.

In step 401 the processor 210 determines whether GNSS signals are being received by the GNSS receiver 251. If GNSS signals are being received, the processor 210 determines in step 402 a current location on the map data from the GNSS signals, and optionally also from the signals received from the gyroscope 296 and accelerometer 297. An advantage of using signals from the gyroscope 296 and accelerometer 297 in conjunction with the GNSS signals is that a more accurate position may be determined. For each new position determined from the GNSS signals, a seed position is updated with this new position (step 403). The method then loops back to step 401.

When the GNSS receiver 251 is not receiving GNSS signals from satellites 120 (for example, because there is no GNSS network coverage), at step 401 the method is directed to step 404 as the first part of the dead-reckoning technique. In step 404, the processor 210 checks to determine whether more than one possible path has already been calculated based on previous estimates of the current location determined from the positioning data received from gyroscope 296 and accelerometer 297. If it is the first time a position is to be estimated by the dead reckoning technique since GNSS signals were lost, possible paths that the navigation device has traveled will have yet to be determined. Accordingly, in such circumstances the processor proceeds to step 405, wherein the processor receives signals from the gyroscope 296 and accelerometer 297 and determines, from the signals, distance traveled and changes in orientation (position data) since the last seed position was determined.

The processor 210, in step 406 retrieves the seed position from memory resource 230 and extrapolates from the seed position using the distance traveled and any change in orientation possible paths traveled by the navigation device 200. In this embodiment, the processor 210 carries out the first calculation of possible paths traveled if the distance traveled and/or change in orientation is above a predetermined threshold. The probability of each path being the path the navigation device traveled may be determined by comparing the changes in orientation with corresponding changes in the angle of the navigable routes of the path. For instance, the changes in orientation may be as a result of a turn made at an intersection of two navigable routes or a curve of the navigable route itself.

An example, of one way in which this can be achieved will now be described with respect to FIG. 6. Dotted line 501 shows a path as indicated by the signals from the gyroscope 296 and accelerometer 297. However, due to errors in the measurements this is not consistent with the navigable routes 502 to 509 of the map data. Accordingly, the processor 210 assigns a probability that each navigable route 503 to 509 has been traveled based on how close the measurements of changes in orientation and distance traveled are to the changes in orientation and distance of the navigable routes 503 to 509 of the map data. In the example given, the first determination is carried out when a change in orientation occurs as the navigation device first moves slightly to the left. As movement to the left conforms more closely to travel along route 503 from B to C than route 504 from B to D, a path for this first change in orientation along route 503 is given a higher probability than a path along route 504.

The probabilities assigned to each path are a weighted sum of individual probabilities of the routes that make up the path (i.e. the sum of the probabilities of the routes that make up the path divided by the total of the probabilities for all routes that make up all the possible paths). Accordingly, first, probabilities are assigned to the routes 503, 504 that make up the paths and then probabilities for the paths are determined from the probabilities determined for the routes. In the example shown in FIG. 6, the probabilities assigned to the path from B to D is approximately 0.486 and the probability assigned to the path from B to C is 0.514. These probabilities are assigned to the paths and stored in memory resource 230 in step 407. It will be understood that in certain situations, a route can belong to more than one path and have more than one probability associated therewith, one for each path to which is belongs.

In step 408, the processor 210 compares the probabilities assigned to the paths and if the probabilities are below a predetermined threshold, the path is discarded.

For example, the threshold at which a path is discarded may be when the path is not one of a number, N, of most likely paths. The greater the value of N the more processing the processor will have to be carry out for each change in orientation/change in direction but the less likely it is that a path is discarded that may later become the most likely path traveled by the navigation device. In most circumstances, discarding all but the two most likely paths is robust enough to find the correct path later if an incorrect path is initially identified as the most likely path. It will be understand that other requirements may be used as an alternative or in addition to this requirement, for example, the processor 210 may be arranged to discard each path that is not the path with the highest probability from further expansions and calculations when the number of expansions of the path is above a predetermined expansion threshold and/or a path may be discarded when the probability that the navigation device traveled that path is below a predetermined threshold.

Figure 6:
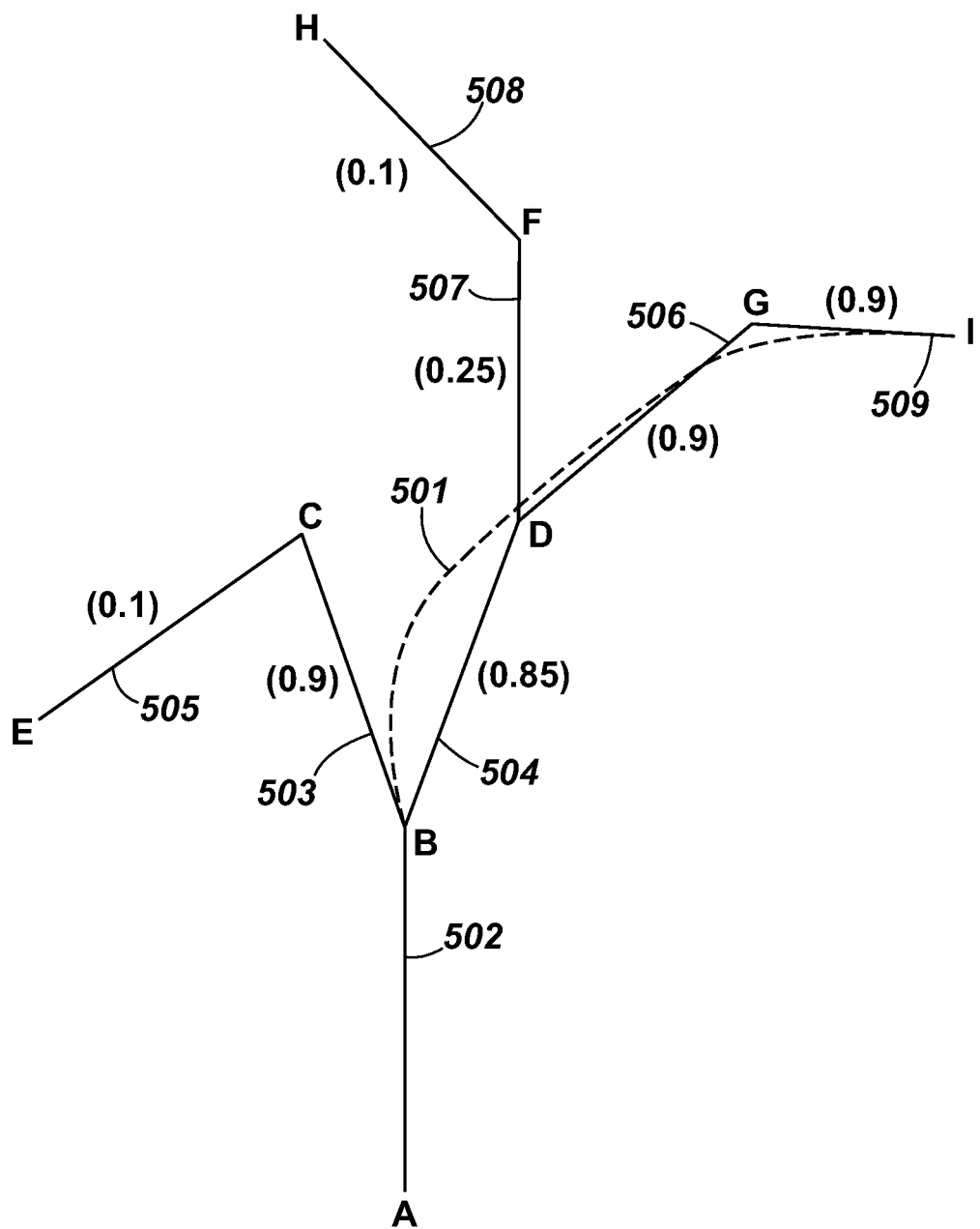
FIG. 6 is an example of a number of possible paths that could be calculated by the navigation device according to an embodiment of the invention.

Accordingly, in the example shown in FIG. 6, the initial two paths along routes 502 and 503 that the processor 210 determines from the initial change in orientation are not discarded as they are the two most likely paths and have a high probability. In step 409, the processor 210 assigns the current location of the navigation device 200 to be the position on the path with the highest probability. For the initial two paths calculated this would be a predicted position on route 503 as this path has the higher probability, 0.514 to 0.486. This current location is then output by the navigation device, for example as a graphic on display 240.

In step 416, the processor 210 removes from the paths routes that are no longer relevant. The routes that are discarded comprise the routes that occur before the initial point at which the paths divide (the initial seed point). In the example shown in FIG. 6, point B is the initial seed point so any contribution to the paths' probabilities contributed by route 502 is removed.

In step 410, the processor 210 checks to determine if more than one path remains and if there is more than one path the processor returns to step 401. Consequently, the processor 210 checks again to see if GNSS signals can be received. If there is still no GNSS coverage, in step 404 the processor 210 checks to determine of more than one path remains. In the example shown in FIG. 6, after the initial change in orientation two possible paths have been retained. Accordingly, the processor 210 goes to step 412. In step 412, the processor determines distance traveled and changes in orientation from the signals received from the gyroscope 296 and accelerometer 297 and in step 413, the processor 210 expands upon the paths that have already been determined to determine a new set of possible paths. Referring back to FIG. 6, this may be carried out because of an expected intersection occurring at a set distance traveled, for example route 503 bearing left at point C into route 505 and route 504 splitting into route 506 and 507 at point D and/or because of a further change in orientation, in FIG. 6 a movement to the right.

As with the previous loop, at step 407 probabilities are calculated for each possible path of the new set of paths. The likelihood of route 505 being traveled is very low 0.1 and the probability of the path from B to E being the path that the navigation device has traveled is calculated by carrying out a weighted sum of the probabilities that route 503 and route 505 have been traveled together. This gives a probability for this path of approximately 0.26. Other possible paths are from B to G and from B to F (comprising routes 504 and 506 and routes 504 and 507, respectively) and probabilities are likewise calculated for these paths, giving 0.45 and 0.29 respectively. In step 408 the path comprising routes 503 and 505 is discarded because the processor 210 only retains the two paths with the highest probability. In step 409 the current location output by the navigation device 200 is changed to the predicted position on the path comprising routes 504 and 506. As more than one possible path remains, the processor goes to step 411 and loops back to step 401.

As the path from B to E has been discarded, point B is no longer a seed point (a point at which paths divide). The new initial seed point is point D. In step 416, the contribution of routes that occur before what is now the new initial seed point (point D) are removed such that probabilities for the two paths D to F and D to G are approximately 0.308 and approximately 0.69 respectively.

This process is then repeated for further changes in orientation and distance, wherein the paths are extrapolated, new paths formed and probabilities calculated for these new paths. In the example shown in FIG. 6, the paths remaining are extrapolated to give new paths D to H and D to I, path D to I comprising routes 506 and 509 and the path D to H comprising routes 507 and 508 with probabilities of 0.84 and 0.16. In step 408 the processor 210 may discard the path D to H comprising routes 507 and 508 because the probability for this path is below a predetermined threshold of 0.2. The current location is thus assigned to the position on the path from D to I. As only one path remains, the processor 210 goes to step 414 and updates the seed position with the current predicted position on the only remaining path and then loops back to step 401 wherein the process is started again unless GNSS signals can now be received.

It will be understood that each extrapolation/expansion of the possible paths may be carried out only when the change in orientation and/or distance is above a predetermined threshold. For example, when a change in angle in a unit time is above a predetermined angle threshold, for example above a few degrees per second, or a change in distance above a predetermined distance threshold, for example, ten(s) or hundred(s) of meters.

Furthermore, it will be understood that the dead-reckoning technique of the invention could be carried out by another processing device, for example off the navigation device by the processor 304 of server 302, the current location determines by this processing sent back to the navigation device across the communication link 318.

The invention claimed is:

1. A navigation device comprising:
   a receiver arranged to receive signals from position sensors indicative of the position of the navigation device;
   a memory having stored therein a seed position and map data which comprises a map of navigable routes in an area;
   an output device arranged to output a current location; and
   a processor arranged to determine distance traveled and changes in orientation from the signals and further arranged to estimate the current location of the navigation device on one of the navigable routes of the map data by:
   using the determined distance traveled and the changes in orientation to extrapolate from the seed position a first set of possible paths along the navigable routes that the navigation device may have traveled and assigning to each path of the first set of possible paths a probability that the navigation device traveled that path,
   for further changes in at least one of orientation and distance, using the determined distance traveled and changes in orientation to expand each of the first set of possible paths to determine a second set of possible paths and assigning to each path of the second set of possible paths a probability that the navigation device traveled that path, and
   assigning the current location to be a current predicted position of the navigation device on the path with the highest probability of the second set of possible paths.

2. A navigation device according to claim 1, wherein the probability of each path being the path the navigation device traveled is determined by comparing the changes in orientation with corresponding changes in the angle of the navigable routes of the path.

3. A navigation device according to claim 2, wherein a change in orientation is a discrete event beginning when a change in angle per unit time above a predetermined angle threshold is detected to when changes in angle per unit time stabilise again to less than the predetermined threshold.

4. A navigation device according to claim 1, wherein the expansion of each of the first set of possible paths and assignment of the probability to each of the second set of possible paths is carried out when the change in distance is above a predetermined distance threshold.

5. A navigation device according to claim 1, wherein a probability for a path is determined by determining a probability that a particular change in at least one of orientation and change in distance corresponds to movement along a particular navigable route that forms the path and multiplying this probability with probabilities calculated for other changes in at least one of orientation and changes in distance corresponding to movement along other navigable routes that form the path.

6. A navigation device according to claim 1, wherein the processor is arranged to discard paths from further expansions and calculations when the probability of the navigation device having traveled that path drops below a predetermined probability threshold.

7. A navigation device according to claim, 6, wherein the processor is arranged to discard paths from further expansions and calculations that are not one of a number, N, of most likely paths.

8. A navigation device according to claim 7, wherein the number, N, of most likely paths is two.

9. A navigation device according to claim 1, wherein the processor is arranged to discard each path that is not the path with the highest probability from further expansions and calculations when the number of expansions of the path is above a predetermined expansion threshold.

10. A navigation device according to claim 1, wherein the processor is arranged to set the seed position in memory to the current location when there is only a single possible path.

11. A navigation device according to claim 1, wherein the processor is arranged to disregard the contribution to the paths' probabilities of routes that are before an initial seed point at which the paths divide.

12. A navigation device according to claim 1, wherein the position sensors comprise sensors arranged to measure at least one of acceleration, speed, distance, time and change in angle.

13. A navigation device according to claim 12, wherein the position sensors comprise at least one of an accelerometer and a gyroscope.

14. A navigation device according to claim 1, wherein the output device is at least one of a display and a speaker.

15. A non-transitory data carrier having stored thereon instructions which, when carried out by a processor connected with a memory, the memory having stored therein a seed position and map data which comprises a map of navigable routes in an area, cause the processor to:
   determining distance traveled and changes in orientation from the position data;
   using the determined distance traveled and the changes in orientation to extrapolate from a seed position a first set of possible paths along the navigable routes that may have been traveled and assigning to each path of the first set of possible paths a probability that the path was traveled,
   assigning the current location to be a current predicted position of the navigation device on the path with the highest probability of the first set of possible paths,
   for further changes in at least one of orientation and/or distance, using the determined distance traveled and changes in orientation to expand each of the first set of possible paths to determine a second set of possible paths and assigning to each of the second set of possible paths a probability that the navigation device traveled that path, and
   assigning the current location to be a current predicted position of the navigation device on the path with the highest probability of the second set of possible paths.

16. A method of estimating a current location on a map of navigable routes using position data, the method comprising:
   determining distance traveled and changes in orientation from the position data;
   using the determined distance traveled and the changes in orientation to extrapolate from a seed position a first set of possible paths along the navigable routes that may have been traveled and assigning to each path of the first set of possible paths a probability that the path was traveled,
   assigning the current location to be a current predicted position of the navigation device on the path with the highest probability of the first set of possible paths,
   for further changes in at least one of orientation and distance, using the determined distance traveled and changes in orientation to expand each of the first set of possible paths to determine a second set of possible paths and assigning to each of the second set of possible paths a probability that the navigation device traveled that path, and assigning the current location to be a current predicted position of the navigation device on the path with the highest probability of the second set of possible paths.

\* \* \* \* \*